US009306836B2

(12) United States Patent
Rollins et al.

(10) Patent No.: US 9,306,836 B2
(45) Date of Patent: Apr. 5, 2016

(54) SEARCHING FOR MULTICAST CONSUMERS IN A NETWORK OF INTERCONNECTED NODES

(75) Inventors: Richard J Rollins, Penryn, CA (US); Duane Edward Mentze, Roseville, CA (US); Mark Patrick Henry, Sacramento, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 500 days.

(21) Appl. No.: 13/562,224

(22) Filed: Jul. 30, 2012

(65) Prior Publication Data

US 2014/0032784 A1    Jan. 30, 2014

(51) Int. Cl.
| | |
|---|---|
| *G06F 15/173* | (2006.01) |
| *H04L 12/761* | (2013.01) |
| *H04L 12/751* | (2013.01) |
| *H04L 12/24* | (2006.01) |
| *H04L 12/18* | (2006.01) |

(52) U.S. Cl.
CPC .............. *H04L 45/16* (2013.01); *H04L 12/185* (2013.01); *H04L 41/12* (2013.01); *H04L 45/02* (2013.01)

(58) Field of Classification Search
CPC ......... H04L 45/00; H04L 45/12; H04L 45/16; H04L 61/20; H04L 61/25; H04L 67/2814; H04W 40/02; G06F 15/173
USPC .................. 709/238, 241; 370/351, 389, 390
See application file for complete search history.

(56) References Cited

U.S. PATENT DOCUMENTS

| | | | | |
|---|---|---|---|---|
| 5,517,494 | A * | 5/1996 | Green | 370/408 |
| 6,732,182 | B1 * | 5/2004 | Beverly, IV | 709/230 |
| 6,961,319 | B2 * | 11/2005 | Novaes | 370/256 |
| 7,296,091 | B1 | 11/2007 | Dutta et al. | |
| 7,349,711 | B2 | 3/2008 | Hu et al. | |
| 7,577,735 | B1 * | 8/2009 | De Groote | H04L 45/60 709/224 |
| 7,643,485 | B2 | 1/2010 | Viswanath et al. | |
| 7,693,146 | B2 * | 4/2010 | Subramanian | 370/390 |
| 7,978,711 | B2 | 7/2011 | Harrang et al. | |
| 8,060,598 | B1 * | 11/2011 | Cook et al. | 709/224 |
| 2005/0041671 | A1 * | 2/2005 | Ikeda et al. | 370/395.52 |
| 2006/0159029 | A1 * | 7/2006 | Samuels et al. | 370/252 |
| 2007/0019647 | A1 * | 1/2007 | Roy | H04L 45/12 370/392 |
| 2007/0280236 | A1 * | 12/2007 | Yang | 370/390 |
| 2009/0257432 | A1 * | 10/2009 | Yamaguchi et al. | 370/390 |
| 2009/0310609 | A1 * | 12/2009 | Fernandez Gutierrez | 370/390 |
| 2010/0011094 | A1 * | 1/2010 | Ver Steeg et al. | 709/220 |
| 2010/0103856 | A1 * | 4/2010 | Kim et al. | 370/312 |
| 2012/0102188 | A1 * | 4/2012 | Shah et al. | 709/224 |
| 2012/0117438 | A1 * | 5/2012 | Shaffer et al. | 714/749 |
| 2012/0150982 | A1 * | 6/2012 | Xu et al. | 709/206 |
| 2012/0218997 | A1 * | 8/2012 | Shah | 370/390 |

(Continued)

OTHER PUBLICATIONS

Deering, et al.; Multicast Listener Discovery (MLD) for IPv6, RFC 2710; Oct. 1999; Network Working Group; IBM; 23 pages.*

(Continued)

*Primary Examiner* — Oleg Survillo
(74) *Attorney, Agent, or Firm* — Mahamedi Paradice LLP

(57) ABSTRACT

Examples described herein provide for generating a multicast consumer search request from a request node in the network. The request is then routed to the interconnected nodes and received at a target node having a directly-connected multicast consumer. Identification information associated with the directly-connected multicast consumer is forwarded from the target node back to the request node.

14 Claims, 7 Drawing Sheets

(56) References Cited

U.S. PATENT DOCUMENTS

| | | | |
|---|---|---|---|
| 2013/0051319 A1* | 2/2013 | Nakahara | 370/328 |
| 2013/0182707 A1* | 7/2013 | Angst et al. | 370/390 |
| 2013/0215891 A1* | 8/2013 | Perreault et al. | 370/390 |
| 2014/0233563 A1* | 8/2014 | Chen et al. | 370/390 |

OTHER PUBLICATIONS

Singh, C., et al., "The Wireless Multicast Coalition Game and the Non-cooperative Association Problem," (Research Paper), Technical Program at IEEE INFOCOM, Apr. 10-15, 2011, pp. 2705-2713.

* cited by examiner

SEARCHING FOR MULTICAST CONSUMERS IN A NETWORK OF INTERCONNECTED NODES

BACKGROUND

Multicast routing involves delivering network content to a set of hosts that are members of a multicast group. A server delivering the content thus need only deliver it as a single stream of data, which then fans out via interconnected routers to one or more group addresses rather than to individual consumer addresses. There are circumstances where it may be helpful to identify the consumers who are members of a given group address.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Examples described herein provide methods and associated apparatus capable of searching a network for the identities of multicast consumers. Identifying multicast consumers in an efficient manner saves network-related costs and optimizes networking efficiencies.

According to one example, a method for searching for multicast consumers in a network of interconnected nodes is disclosed. The method includes generating a multicast consumer search request from a request node in the network. The request is then routed to the interconnected nodes and received at a target node having a directly-connected multicast consumer. Identification information associated with the directly-connected multicast consumer is forwarded from the target node back to the request node.

According to a further example, a method of operation in a router that forms a node in a network of interconnected nodes is disclosed. The method includes, in a first mode, generating a multicast consumer search request and receiving identity information associated with multicast consumers from the network of interconnected nodes in response to the request. In a second mode, the method involves receiving a multicast consumer search request from an initiator node in the network of interconnected nodes. Identity information for directly-connected consumers is returned to the initiator node, and the request is forwarded to other connected nodes in the network.

In yet another example, a router is disclosed that includes a port for interfacing with a network of interconnected routers and I/O controller circuitry coupled to the port. Processing logic is coupled to the I/O controller circuitry and includes multicast consumer search logic to, in a first mode, generate multicast consumer search requests for transmission to the interconnected routers, and receive identity information of multicast consumers from the network of interconnected routers.

Figure 1:
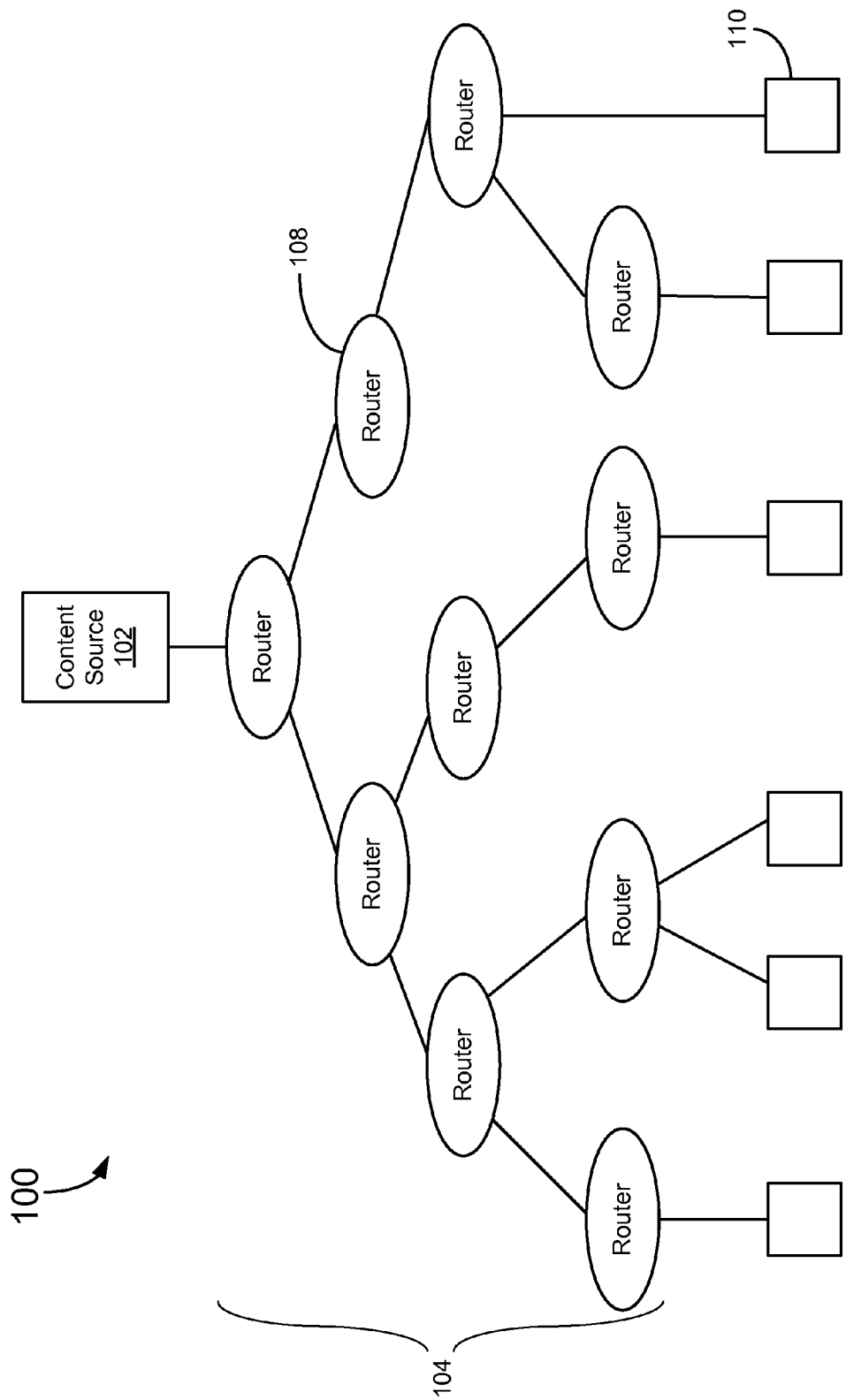
FIG. 1 illustrates an example network architecture for routing a multicast consumer search request.

Referring now to FIG. 1, a computing network architecture, generally designated 100, includes a multicast content source 102 coupled to a content distribution network 104. The distribution network 104 selectively feeds the content from the source 102 to plural clients 110 in accordance with a multicast protocol.

In some examples, a computing network can include a number of devices networked together in a local area network (LAN) and/or wide area network (WAN) via routers, hubs, switches, and the like. As used herein a "network device" means a switch, router, hub, bridge, access point, etc., e.g., a router having processor and memory resources and connected to a network 100.

In some examples, devices can be connected to one another and/or to other networks using routers, hubs, and/or switches, among other devices. As noted above, such devices can include a processor in communication with a memory and may include network chips having hardware logic, e.g., in the form of application specific integrated circuits (ASICs), associated with the number of network ports. The term "network" as used herein is not limited to the number, type, and/or configuration of devices illustrated in FIG. 1.

As used herein, a network can provide a communication system that links two or more devices, allows users to access resources on other devices, and exchange messages with other users. A network allows users to share resources on their own systems with other network users and to access information on centrally located systems or systems that are located at remote offices. It may provide connections to the Internet or to the networks of other organizations. Users may interact with network-enabled machine readable instruction, e.g., software and/or firmware, applications to make a network request, such as to get a file. Applications may also communicate with network management machine readable instructions, which can interact with network hardware to transmit information between devices on the network.

Further referring to FIG. 1, the multicast source 100, as an example, includes one or more content servers that store accessible content for distribution to multiple users via a multicast protocol. In contrast to a unicast protocol, which routes information directly between the server and an end-user, a multicast protocol feeds content to a group address, where the content is replicated and fed to multiple users that have requested the given multicast group address.

The distribution network 104 includes a plurality of interconnected nodes in the form of routers 108. The routers 108 cooperate to form connection paths between the end user clients 110 desiring the multicast content, and the content source 102. Further detail pertaining to an example of a router 108 is shown in FIG. 2, more fully described below.

In some circumstances, such as troubleshooting problems with multicast content routing, it is desirable to know the destination addresses associated with the end users, or consumers. The distribution network routers described herein have the capability in terms of underlying software and hardware to generate search requests to automatically discover multicast consumer addresses belonging to a multicast group.

By generating the identity information automatically, other less efficient ways to manually determine the consumer addresses may be avoided.

Figure 2:
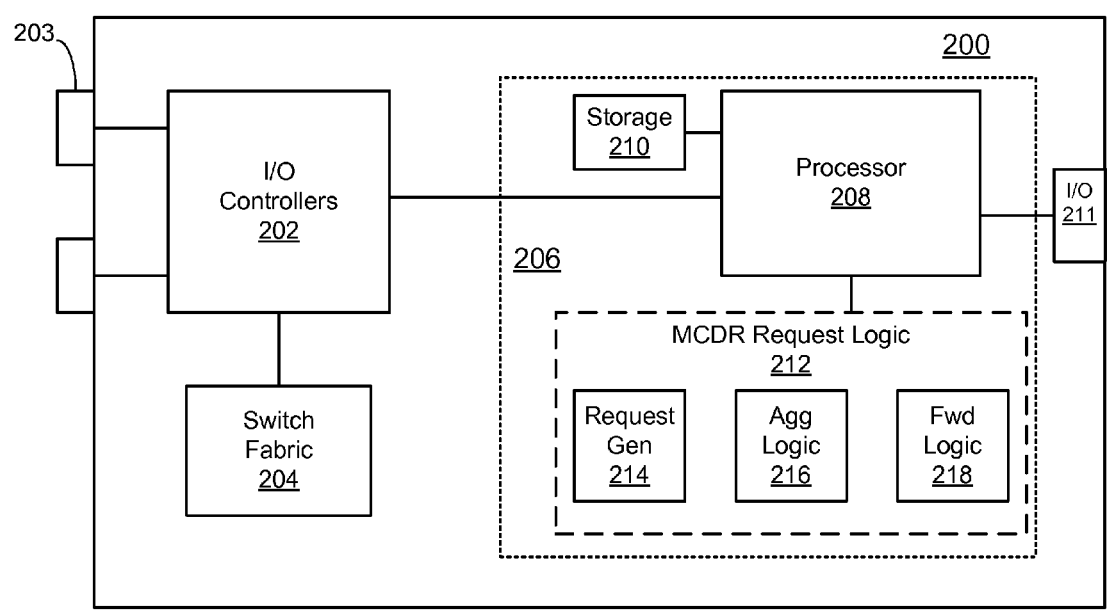
FIG. 2 illustrates an example router for use in the network architecture of FIG. 1.

FIG. 2 illustrates one example of a router, generally designated 200, for use with the network topology 100 of FIG. 1. The router 200 includes I/O control circuitry 202 that interfaces with at least one port 203 (usually plural ports) for connecting to network transmission media (such as Ethernet cabling). Switching circuitry 204 in the form of a switch fabric forms connections between the ports. Processing logic 206 interfaces with the I/O control circuitry 202 and the switch fabric 204 and includes processing resources such as a general purpose processor or CPU 208, storage 210, and an I/O interface 211 that transfers data to and from a databus (not shown).

With continued reference to FIG. 2, the processing logic 206 also includes multicast request logic 212 that supports the generation, encoding, decoding, and storage of multicast consumer discovery requests and resulting location information. The multicast request logic includes a multicast request generator 214 to, when the router operates in an "initiator" mode, create a multicast consumer discovery request (MCDR) for transmission to all other connected routers. Aggregation logic 216 allows the router to collect and organize multicast consumer identities provided in response to the MCDR. The router also includes forwarding logic 218 that, when the router operates in an "intermediary" or "target" mode, either forwards MCDR requests to other connected routers, or forwards multicast consumer addresses for directly-connected consumers to the initiator router.

Further referring to FIG. 2, the multicast consumer discovery request (MCDR) is a command that may be initiated from any router in a given network. The command itself represents a request to all connected routers asking them to send the identities of any multicast consumers that are directly-connected to them to the requester. Identities may be obtained as long as the multicast consumer has already issued a request to receive the multicast data, and they are connected to the network topology. Additionally, the routers are requested to forward the request on to all routers they are connected to. As one example, the command takes the form of an IP packet and includes the address of the initiating router, and the multicast group address being investigated. Optionally, the command may include a multicast source address so that only consumers interested in a specific source will be identified. A further optional feature involves inserting a maximum hop-count into the command to limit how far the MCDR can propagate within a given network. Additionally, a flag may be included within the request to indicate whether or not the MCDR should cross from one multicast routing domain into another.

Figure 3:
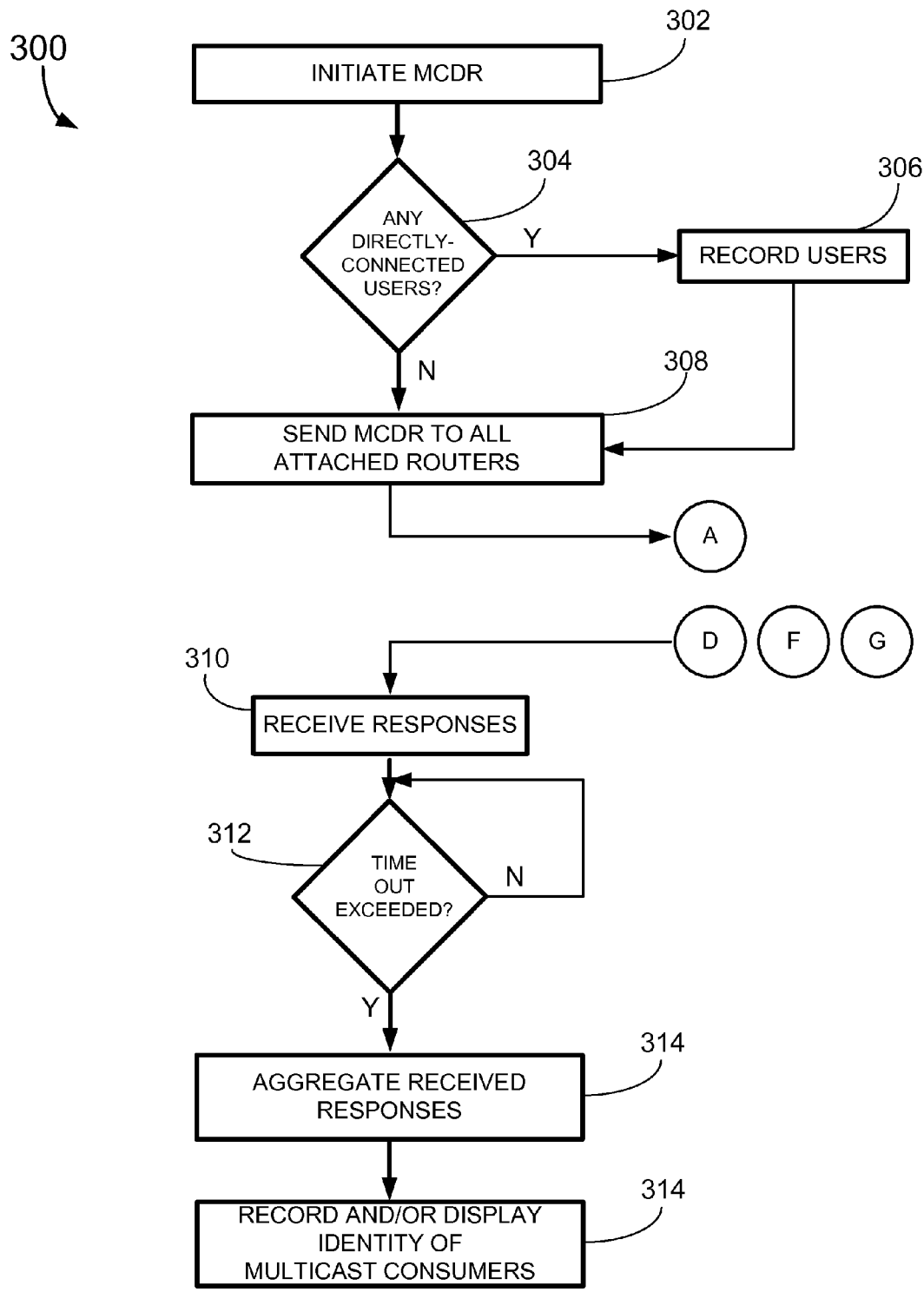
FIG. 3 illustrates an example flowchart including steps corresponding to a method employed by a router requesting a multicast consumer search.

FIG. 3 illustrates a flowchart of a method of operation, according to one example. The method involves steps that correspond to operation of the router 200 in the first mode of operation, specifically as an "initiator" router in response to programmed software instructions resident in the router. In this mode, which is activated by a network user such as a network technician, the router is prompted to initiate the generation of an MCDR, at step 302. A determination is then made, at step 304, whether the initiator router is directly connected to any multicast consumers. If so, those consumer addresses are recorded, at step 306. The generated MCDR is then packaged and transmitted to all routers that are connected to the initiator router, at step 304. At this point, the MCDR is handled by either one or more "intermediate" routers or "target" routers, depending on whether the routers that receive the MCDR are directly-connected to multicast consumers, and operational flow goes through bubble "A" of FIG. 3 to bubble "A" of FIG. 4.

Figure 4:
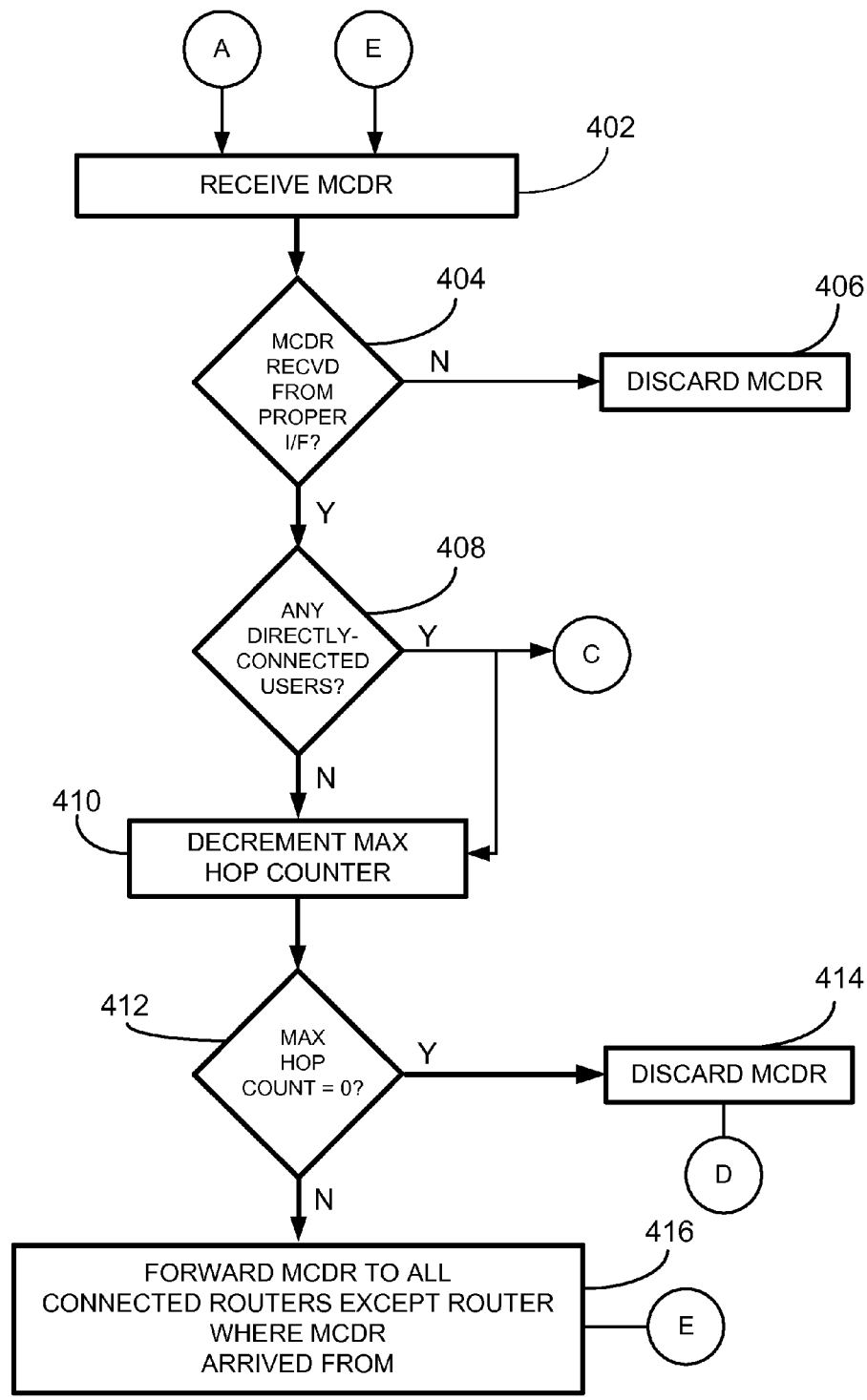
FIG. 4 illustrates an example flowchart including steps corresponding to a method employed by an intermediate router in communication with the requesting router of FIG. 3.

Referring now to FIG. 4, the next router(s) to receive the MCDR from the "initiator" router, at step 402, carries out a determination, at step 404, as to whether the MCDR was received from an interface associated with a network path back to the initiating router. This is carried out to prevent improperly generated MCDR's from propagating through the network. If the interface is one that isn't associated with a path back to the initiator, the MCDR is discarded, at step 406. If the interface is associated with a path back to the initiator, then a further determination is made as to whether the current router is connected to any directly-connected multicast users, at step 408. If so, then operation proceeds in accordance with steps associated with a target router via bubble "C", and shown in the flowchart set forth in FIG. 5. A hop counter is also decremented, at step 410. Note that a given router might be both a target router and an intermediate router.

Further referring to FIG. 4, if there are no directly-connected multicast consumers, then the hop counter value associated with the MCDR is decremented, at step 410. A determination is then carried out, at step 412, whether the hop count is "zero." If so, then the maximum number of hops, or router-to-router transfers, have occurred and the MCDR is discarded, at step 414, and a message sent to the initiator router indicating that the hop count was reached. The message is sent via bubble "D" as a response back to corresponding bubble "D" in FIG. 3. If the hop count has not reached zero, then the MCDR is forwarded to all connected routers except the one where the MCDR came from, at step 416. Processing then carries on through bubble "E" (which, although shown as an input to the top of FIG. 4, it is to be understood that the MCDR is forwarded to a different router).

Figure 5:
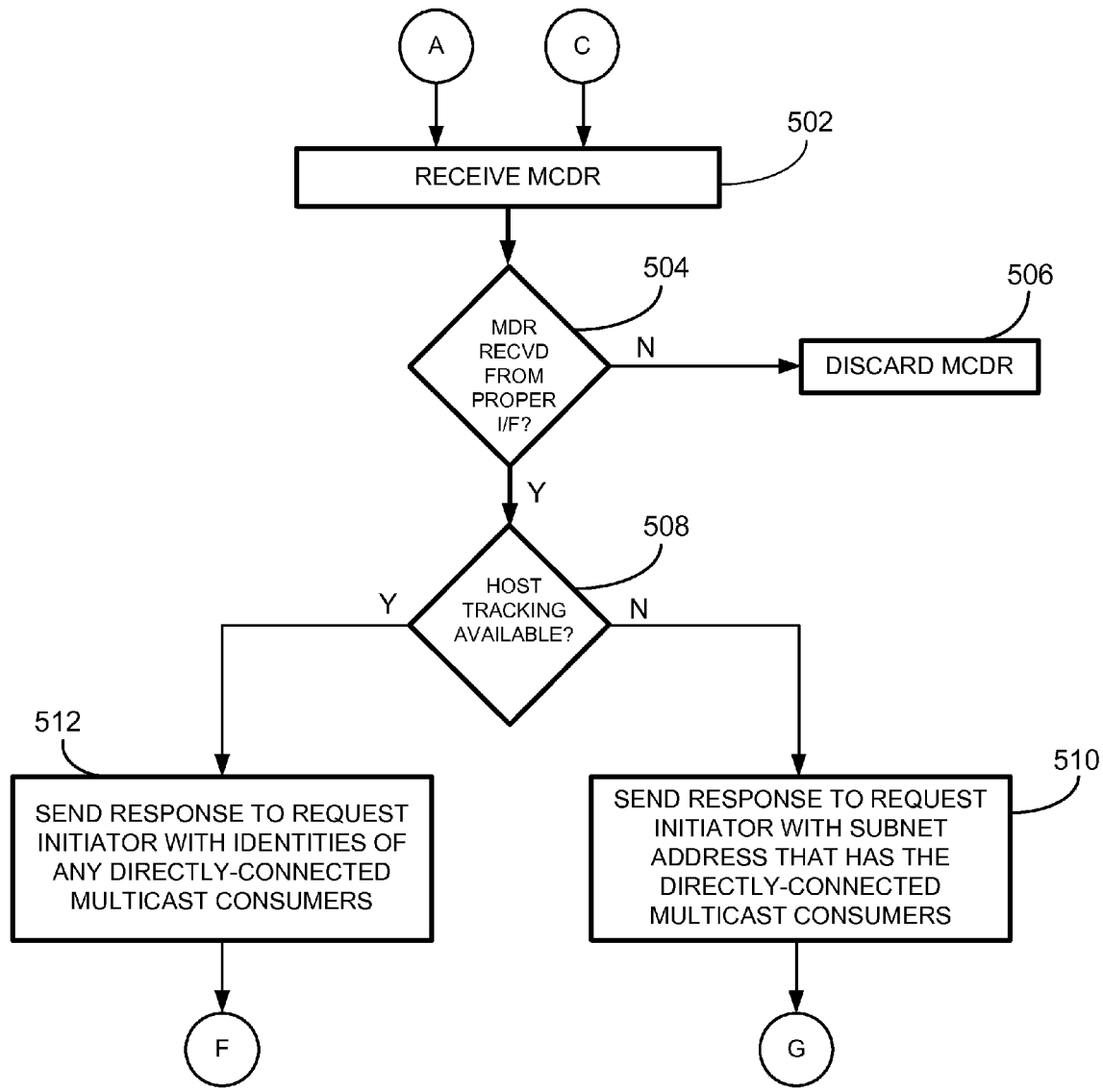
FIG. 5 illustrates an example flowchart including steps corresponding to a method employed by a target router.

With reference now to FIG. 5, target routers, or those having directly-connected multicast consumers, receive at step 502, either MCDRs from the initiating router itself (via bubble "A") or begin processing as intermediate routers until determining there are directly-connected multicast consumers and processing the MCDR via bubble "C". Once received, a determination is carried out, at step 504, whether the MCDR was received from an interface associated with a network path back to the initiating router. If the interface is one that isn't associated with a path back to the initiator, the MCDR is discarded, at step 506.

Further referring to FIG. 5, after confirming the MCDR arrived via a proper interface, a determination is carried out, at step 508, as to whether host tracking is available. Generally, multicast consumers are identified on a router by a "local listener" protocol such as IGMP or MLD (based on whether the IP protocol is IPv4-based or IPv6). Depending on the capabilities of the router, the router may only be able to identify network subnets with consumers attached without knowing how many consumers are on that subnet. A host tracking scheme is one way that the router can identify individual consumers on a subnet. If host tracking is available, then the target router sends a response to the request initiator with the identities of any directly-connected multicast consumers, at step 510. At this time, the target router might also perform health checks as described more fully below to determine the reachability of the consumer. The response is routed back to the initiator router via bubble "F". If host tracking is not available, then a response is sent to the request initiator with a subnet address that has the directly-connected multicast consumers, at step 512. At this point also, the target router may initiate a reachability determination for the consumers. The response is routed back to the initiating router via bubble "G".

Referring back to FIG. 1, the propagating MCDRs through the network result in a variety of responses received by the initiating router in the form of messages and identifying addresses, at step 310. In some examples, once the hop count is reached or a timeout occurs via a determination at 312, the received responses are gathered and aggregated by the aggregation logic, at step 314. The aggregation involves recording the responses and listing or otherwise displaying the multicast consumer addresses (or subnets), at step 316 for straightforward visual evaluation by the network user or other administrator.

With the multicast consumer addresses generated automatically via router propagation of the MCDR, a manual evaluation of each router's connections to determine the same information may be avoided. This results in significant savings in terms of cost and time required to troubleshoot the network.

In one further example, a generated list of multicast consumers is further evaluated to confirm whether each identified consumer has a valid shortest path or shared tree route. In the event a given multicast consumer fails the shortest path and/or shared tree route health check, the multicast consumer is viewed as an unreachable consumer (in terms of multicast data) and the associated address recorded into a master list of unreachable consumers.

FIGS. 6A-6D illustrate an example of a computing network 600 for checking a multicast routing path. The computing network 600 illustrated in FIGS. 6A-6D includes routers (604-1), router B (604-2), router C (604-3), and router D (604-4). Each of the routers can include a number of interfaces to the network, where the interfaces are referred to by the router on which they are located and the specific interface on that router. For example interface b on router C is referred to as interface C.b. In some examples, the number of interfaces can have a multicast routing protocol (MRP) running, as indicated by the MRP designation on the routers illustrated in FIGS. 6A-6D. In FIGS. 6A-6D, router 604-1 includes four interfaces, designated as interfaces A.a, A.b, A.c, and A.d. Router 604-2 includes four interfaces, designated as interfaces B.a, B.b, B.c, and B.d. Router 604-3 includes four interfaces, designated as interfaces C.a, C.b, C.c, and C.d. Router 604-4 includes four interfaces, designated as interfaces D.a, D.b, D.c, and D.d.

The routers illustrated in FIGS. 6A-6D can include a number of network connections. A number of network connections and routers can be used to connect a router to another router. In FIGS. 6A-6D, a network connection connects interface A.c of router 604-1 to interface B.b of router 604-2. Network connection connects interface B.c of router 604-2 to interface C.b of router 604-3. Network connection connects interface C.c of router 604-3 to interface D.b of router 604-4. The network connections can be used to transfer data between the number of routers. The network connections can be used to transfer data from any of the interfaces of a router to another interface of another router if there is a network connection connecting the two routers.

FIGS. 6A-6D illustrate an example of a computing network 600 for checking a multicast routing path. In FIGS. 6A-6D, checking a multicast routing path includes checking the path between an initial router and an end point router, where the end point router is a rendezvous point router (RPR). The initial router is a target router that has been found in the search described above. An end point router can be the final router on a path when checking a multicast routing path. An RPR is a router associated with a group or group range of multicast packets that routers in a network will look to receive the multicast packets in the group or group range. An RPR can be a root of a shared tree in a multicast network. In some examples, a test can be executed on the routers on the path between the initial router and the rendezvous point router. The test can be executed on the initial router, which is the test initiator router (TIR), and can continue to be executed in sequence on each of the routers on the path until an unsuccessful response is received from a router on the path or until a successful response is received from the rendezvous point router. The router on which the test is being executed can be referred to as the router under test (RUT). If an unsuccessful response is received from a router on the path, the test indicates that no path is available for transmitting multicast packets between the initial router and the rendezvous point router on the path. If a successful response is received from the rendezvous point router, the test indicates that the path is available for transmitting multicast packets between the initial router and the rendezvous point router.

In some examples, the test can include sending queries to the routers on the path and receiving responses from the routers on the path. The queries can be received by a router on an ingress interface and sent onto the next router on the path on an egress interface. The responses can include a code indicating whether the test was successful or unsuccessful. The responses can also include the network address of the router that is sending the response and a message that indicates why the test was successful or unsuccessful.

The test that is executed on the routers can include determining if a multicast routing protocol (MRP) is running on the ingress interface of the RUT. If an MRP is not running, an unsuccessful response with a 'No MRP' message is returned to the TIR.

If an MRP is running, the test goes on to determine if the RPR address for the group in the test is a local address on the RUT. If the RPR address is a local address on an interface of the RUT and that interface is up, then a successful response with a 'RP Reached' message is returned to the TIR. If the RPR address is a local address on an interface of the RUT that is down, then an unsuccessful response with a 'RP Reached' message is returned to the TIR. If the RPR address is not a local address on the RUT, the test goes on to perform a multicast Reverse Path Forward (RPF) lookup towards the RPR. A multicast RPF lookup can determine an egress interface of the RUT towards a test end point router, an address of the next hop neighbor, and if the egress interface is running an MRP. If the multicast RPF lookup is a failure, then an unsuccessful response with a 'RPF Fail' message is sent to the TIR.

If the multicast RPF lookup is successful, then the test goes on to determine if the RP-set of the TIR matches the RP-set of the RUT. An RP-set is the range of multicast groups for which an RPR is responsible. If the RP-set of the TIR does not match the RP-set of the RUT, then an unsuccessful response with a 'No RP-set' message or a 'More Specific RP-set' message is sent to the TIR. The 'No RP-set message indicates that the groups and/or group range in the RP-set of the RUT did not match any of groups and/or group range in the RP-set of the TIR. The 'More Specific RP-set' message indicates that the groups and/or group range in the RP-set of the RUT is narrower than the groups and/or group range in the RP-set of the TIR.

If the RP-set of the TIR matches the RP-set of the RUT, then the test goes onto determine if the unicast next hop neighbor router is a known multicast neighbor router. If the next hop neighbor is not a known multicast neighbor, then an unsuccessful response with a 'No Neighbor' message is sent to the TIR. If the next hop neighbor is a known multicast neighbor, then a successful response with a 'RPR Not Reached' message is sent to the TIR and the test can be executed on the next successive router (e.g., the known multicast neighbor) on the path.

Figure 6A:
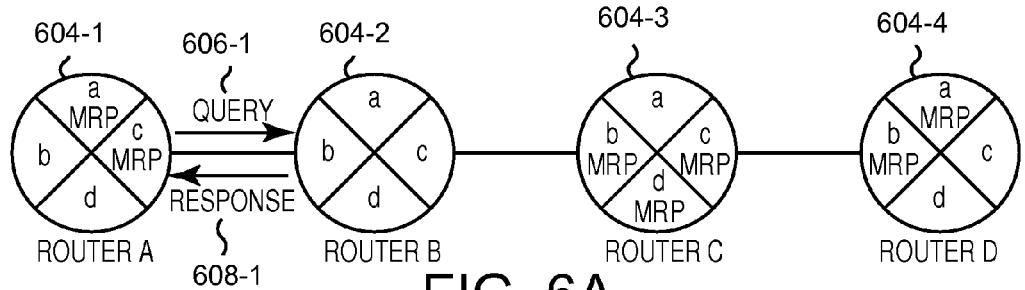
FIGS. 6A-6D illustrate an example of a computing network 600 for checking a multicast routing path.

FIGS. 6A-6D illustrate examples of executing a test to check a multicast routing path between an initial router 604-1 and a rendezvous point router (RPR) 604-4. In FIG. 6A, router 604-1 is the test initiator router (TIR). Router 604-1 sends query 606-1 to router 604-2. Router 604-2 can begin execution of query 606-1 by determining if router 604-2 is running an MRP on ingress interface B.b. Router 604-2 is not running an MRP on interface B.b, therefore the test is unsuccessful. Router 604-2 sends response 608-1 to the TIR, router 604-1. Response 608-1 includes a code that indicates the test was unsuccessful, the network address of router 604-2, and a 'No MRP' message that indicates an MRP was not running on router 604-2. The unsuccessful response 608-1 received by the TIR, router 604-1, ends the test.

Figure 6B:
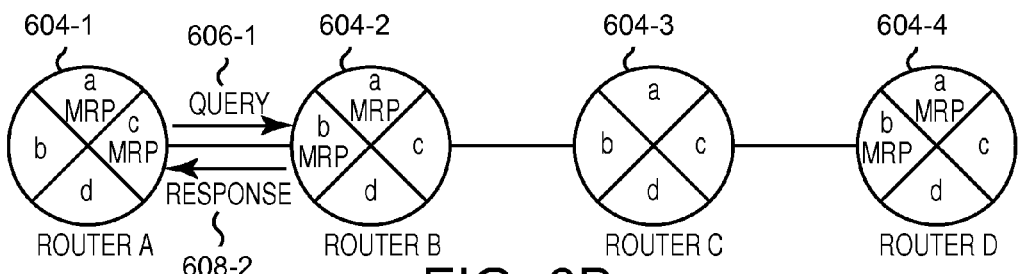

In FIG. 6B, router 604-1 is the test initiator router (TIR). Router 604-1 sends query 606-1 to router 604-2. Router 604-2 can begin execution of query 606-1 by determining if router 604-2 is running an MRP on ingress interface B.b. Router 604-2 is running an MRP on interface B.b, therefore the test goes on to determine if the RPR address for the group in the test is a local address on router 604-2. The RPR address for the group in the test is not a local address on router 604-2, therefore the test goes on to perform a multicast Reverse Path Forward (RPF) lookup towards the RPR, router 604-4. The multicast RPF lookup is a failure, so router 604-2 sends response 608-2 to the TIR, router 604-1. Response 608-2 includes a code that indicates the test was unsuccessful, the network address of router 604-2, and a 'RPF Fail' message that indicates router 604-2 is not the RPR and that an attempt to get to next multicast neighbor towards the RPR was unsuccessful. The unsuccessful response 608-2 received by the TIR, router 604-1, ends the test.

Figure 6C:
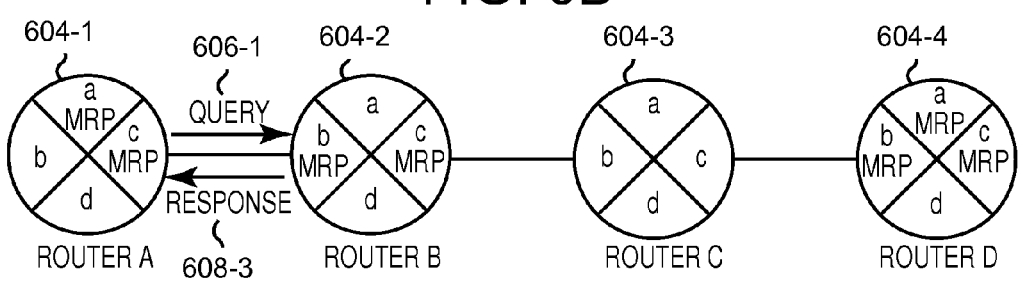

In FIG. 6C, router 604-1 is the test initiator router (TIR). Router 604-1 sends query 606-1 to router 604-2. Router 604-2 can begin execution of query 606-1 by determining if router 604-2 is running an MRP on ingress interface B.b. Router 604-2 is running an MRP on interface B.b, therefore the test goes on to determine if an RPR address is a local address on router 604-2. The RPR address not a local address on router 604-2, therefore the test goes on to perform a multicast Reverse Path Forward (RPF) lookup towards the RPR, router 604-4. The multicast RPF lookup is successful, therefore the test goes on to determine if the RP-set of the TIR matches the RP-set of router 604-2. In FIG. 6C, the RP-set of the TIR, router 604-1, matches the RP-set of router 604-2, therefore the test goes onto determine if the next hop neighbor is a known multicast neighbor. The next hop neighbor, router 604-3 is not a known multicast neighbor, so router 604-2 sends response 608-3 to the TIR, router 604-1. Response 608-3 includes a code that indicates the test was unsuccessful, the network address of router 604-2, and a 'No Neighbor' message that indicates the next hop router of router 604-2 is not a known multicast neighbor. The unsuccessful response 608-3 received by the TIR, router 604-1, ends the test.

Figure 6D:
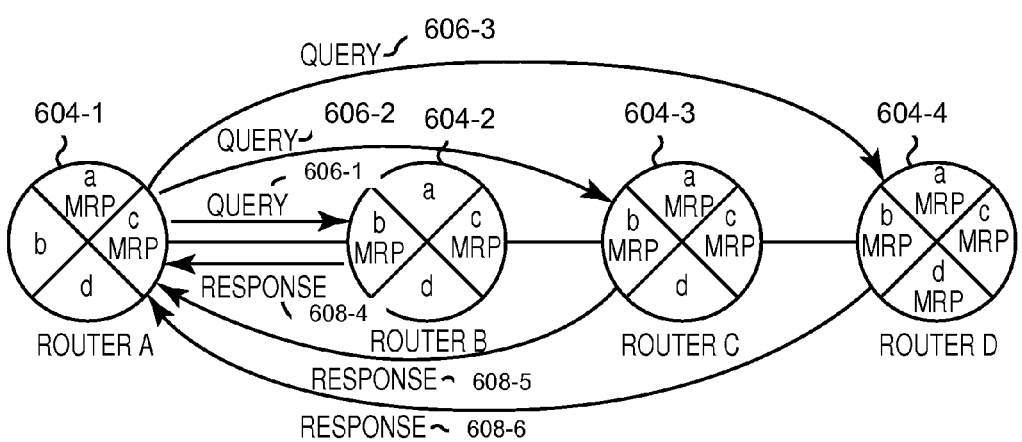

In FIG. 6D, router 604-1 is the test initiator router (TIR). Router 604-1 sends query 606-1 to router 604-2. Router 604-2 can begin execution of query 606-1 by determining if router 604-2 is running an MRP on ingress interface B.b. Router 604-2 is running an MRP on interface B.b, therefore the test goes on to determine if the RPR for the group in the test address is a local address on router 604-2. The RPR address for the group in the test is not a local address on router 604-2, therefore the test goes on to perform a multicast Reverse Path Forward (RPF) lookup towards the RPR, router 604-4. The multicast RPF lookup is successful, therefore the test goes on to determine if the RP-set of the TIR matches the RP-set of router 604-2. In FIG. 1D, the RP-set of the TIR, router 604-1, matches the RP-set of router 604-2, therefore the test goes onto determine if the next hop neighbor is a known multicast neighbor. The next hop neighbor, router 604-3 is a known multicast neighbor, so router 604-2 sends response 608-4 to the TIR, router 604-1. Response 608-4 includes a code that indicates the test was successful, the network address of router 604-2, and a 'RPR Not Reached' message that indicates that router 604-2 is an interim router on the path between the TIR, router 604-1 and the RPR, router 604-4 that successfully passed the test and the test can continue by sending query 606-2 to the next hop router, router 604-3.

Router 604-3 can begin execution of query 606-2 by determining if router 604-3 is running an MRP on ingress interface C.b. Router 604-3 is running an MRP on interface C.b, therefore the test goes on to determine if an RPR address is a local address on router 604-3. The RPR address is not a local address on router 604-3, therefore the test goes on to perform a multicast Reverse Path Forward (RPF) lookup towards the RPR, router 604-4. The multicast RPF lookup is successful, therefore the test goes on to determine if the RP-set of the TIR matches the RP-set of router 604-3.

In some examples, the RP-set of the TIR, router 604-1, does not match the RP-set of router 604-3, therefore router 604-3 can send response 608-5 to the TIR, router 604-1. Response 608-5 includes a code that indicates the test was unsuccessful, the network address of router 604-3, and a 'No RP-set' message that indicates the groups and/or group range in the RP-set of router 604-3 did not match any of groups and/or group range in the RP-set of the TIR, router 604-1, or a 'More Specific RP-set' message that indicates the groups and/or group range in the RP-set of router 604-3 is narrower than the groups and/or group range in the RP-set of the TIR, router 604-1. The unsuccessful response 608-5 received by the TIR, router 604-1, ends the test.

In some examples, the RP-set of the TIR, router 604-1, matches the RP-set of router 604-3, therefore the test goes onto determine if the next hop neighbor is a known multicast neighbor. The next hop neighbor, router 604-4 is a known multicast neighbor, so router 604-3 sends response 608-5 to the TIR, router 604-1. Response 608-5 includes a code that indicates the test was successful, the network address of router 604-3, and a 'RPR Not Reached' message that indicates that router 604-3 is an interim router on the path between the TIR, router 604-1 and the RPR, router 604-4 that successfully passed the test and the test can continue by sending query 606-3 to the next hop router, router 604-4.

Router 604-4 can begin execution of query 606-3 by determining if router 604-4 is running an MRP on ingress interface D.b. Router 604-4 is running an MRP on interface D.b, therefore the test goes on to determine if an RPR address is a local address on router 604-4. The RPR address is a local address on router 604-4, therefore response 608-6 can be sent to the TIR, router 604-1. Response 608-6 can include a code that indicates the test was successful, the network address of router 604-4, and a 'RPR Reached' message that indicates that RPR, router 604-4 was reached. The TIR, router 604-1, can use the responses 608-4, 608-5, and 608-6 to determine if the path including routers 604-1, 604-2, 604-3, and 604-4 is healthy and available for transmitting multicast packets between router 604-1 and router 604-4. In some examples, the successful responses received by a TIR can indicate that a path is healthy and available for transmitting multicast packets between a TIR and a RPR. In some examples, the unsuccessful responses received by a TIR can indicate that a path is not healthy and is not available for transmitting multicast packets between a TIR and a RPR. The unsuccessful response received by a TIR can also be used to determine where a path is broken and what needs to fixed on a router to make that router a healthy router on the path.

FIGS. 7A-7D illustrate an example of a computing network 700 for checking a multicast routing path. The computing network 700 illustrated in FIGS. 7A-7D includes routers 704-1 coupled to router 704-2, router 704-2 coupled to router 704-3, and router 704-3 coupled to a data source. FIGS. 7A-7D illustrate an example of a computing network 700 for checking a multicast routing path.

In FIGS. 7A-7D, checking a multicast routing path includes checking the path between an initial router and an end point router, where the end point router is a source designated router (DR). A source DR is the router closest to a data source on a shortest path tree in a multicast network. The source designated router can be the router that receives data from a source to send as multicast packets throughout a network. In some examples, a test can be executed on the routers on the path between the initial router and the source designated router. The test can be executed on the initial router, which is the test initiator router (TIR), and can continue to be executed in sequence on each of the routers on the path until an unsuccessful response is received from a router on the path or until a successful response is received from the source designated router. The router on which the test is being executed can be referred to as the router under test (RUT). If an unsuccessful response is received from a router on the path, the test indicates that the path is unavailable for transmitting multicast packets between the initial router and the source designated router on the path. If a successful response is received from the source designated router, the test indicates that the path is available for transmitting multicast packets between the initial router and the source designated router on the path.

In some examples, the test can include sending queries to the routers on the path and receiving responses from the routers on the path. The responses can include a code indicating whether the test was successful or unsuccessful. The responses can also include the network address of the router that is sending the response and a message that indicates why the test was successful or unsuccessful.

The test that is executed on the routers can include determining if a multicast routing protocol (MRP) is running on the RUT. If an MRP is not running, an unsuccessful response with a 'No MRP' message is returned to the TIR.

If an MRP is running, the test goes on to determine if a multicast source is directly connected to the RUT. If the multicast source is directly connected to the RUT, then a successful response with a 'DR Reached' message is returned to the TIR. If the multicast source is not directly connected to the RUT, the test goes on to perform a multicast Reverse Path Forward (RPF) lookup towards the multicast source. If the multicast RPF lookup is a failure, then an unsuccessful response with a 'RPF Fail' message is sent to the TIR.

If the multicast RPF lookup is successful, then the test goes onto determine if the next hop neighbor is a known multicast neighbor. If the next hop neighbor is not a known multicast neighbor, then an unsuccessful response with a 'No Neighbor' message is sent to the TIR. If the next hop neighbor is a known multicast neighbor, then a successful response with a 'DR Not Reached' message is sent to the TIR and the test can be executed on the next successive router (e.g., the known multicast neighbor) on the path.

Figure 7A:
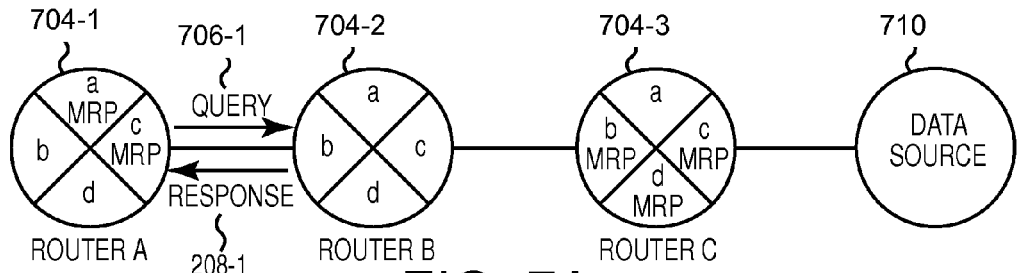
FIGS. 7A-7D illustrate an example of a computing network 700 for checking a multicast routing path.

FIGS. 7A-7D illustrate examples of executing a test to check a multicast routing path between an initial router 704-1 and source designated router (DR) 704-3. In FIG. 7A, router 704-1 is the test initiator router (TIR). Router 704-1 sends query 706-1 to router 704-2. Router 704-2 can begin execution of query 706-1 by determining if router 704-2 is running an MRP on ingress interface B.b. Router 704-2 is not running an MRP on interface B.b, therefore the test is unsuccessful. Router 704-2 sends response 708-1 to the TIR, router 704-1. Response 708-1 includes a code that indicates the test was unsuccessful, the network address of router 704-2, and a 'No MRP' message that indicates an MRP was not running on router 704-2. The unsuccessful response 708-1 received by the TIR, router 704-1, ends the test.

Figure 7B:
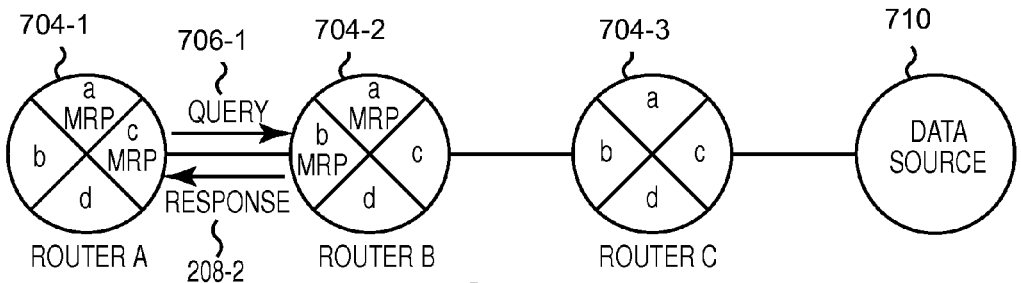

In FIG. 7B, router 704-1 is the test initiator router (TIR). Router 704-1 sends query 706-1 to router 704-2. Router 704-2 can begin execution of query 706-1 by determining if router 704-2 is running an MRP. Router 704-2 is running an MRP, therefore the test goes on to determine if the multicast source of data source 710 is directly connected to router 704-2. The multicast source of data source 710 is not directly connected to router 704-2, therefore the test goes on to perform a multicast Reverse Path Forward (RPF) lookup towards the source DR, router 704-4. The multicast RPF lookup is a failure, so router 704-2 sends response 708-2 to the TIR, router 704-1. Response 708-2 includes a code that indicates the test was unsuccessful, the network address of router 704-2, and a 'RPF Fail' message that indicates router 704-2 is not the source DR and that an attempt to get to next multicast neighbor towards the source DR was unsuccessful. The unsuccessful response 708-2 received by the TIR, router 704-1, ends the test.

Figure 7C:
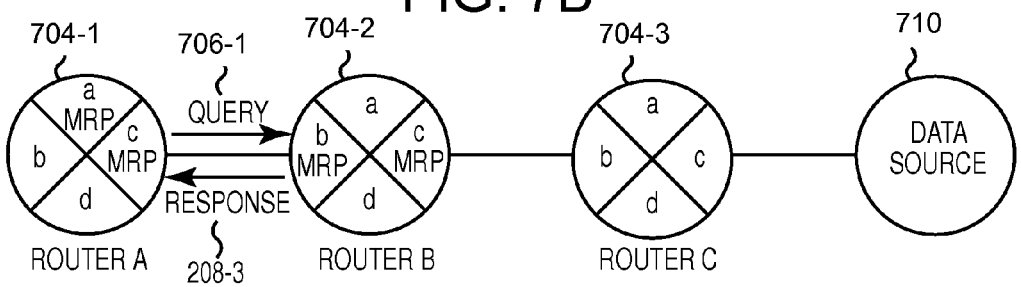

In FIG. 7C, router 704-1 is the test initiator router (TIR). Router 704-1 sends query 706-1 to router 704-2. Router 704-2 can begin execution of query 706-1 by determining if router 704-2 is running an MRP. Router 704-2 is running an MRP, therefore the test goes on to determine if the multicast source of data source 710 is directly connected to router 704-2. The multicast source of data source 710 is not directly connected to router 704-2, therefore the test goes on to perform a multicast Reverse Path Forward (RPF) lookup towards the source DR, router 704-4. The multicast RPF lookup is successful, therefore the test goes on to determine if the next hop neighbor is a known multicast neighbor. The next hop neighbor, router 704-3 is not a known multicast neighbor, so router 704-2 sends response 708-3 to the TIR, router 704-1. Response 708-3 includes a code that indicates the test was unsuccessful, the network address of router 704-2, and a 'No Neighbor' message that indicates the next hop router of router 704-2 is not a known multicast neighbor. The unsuccessful response 708-3 received by the TIR, router 704-1, ends the test.

Figure 7D:
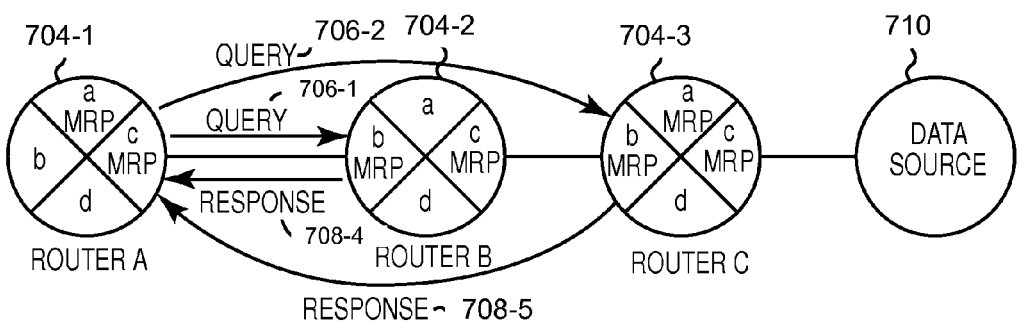

In FIG. 7D, router 704-1 is the test initiator router (TIR). Router 704-1 sends query 706-1 to router 704-2. Router 704-2 can begin execution of query 706-1 by determining if router 704-2 is running an MRP. Router 704-2 is running an MRP, therefore the test goes on to determine if the multicast source of data source 710 is directly connected to router 704-2. The multicast source of data source 710 is not directly connected to router 704-2, therefore the test goes on to perform a multicast Reverse Path Forward (RPF) lookup towards the source DR, router 704-4. The multicast RPF lookup is successful, therefore the test goes on to determine if the next hop neighbor is a known multicast neighbor. The next hop neighbor, router 704-3 is a known multicast neighbor, so router 704-2 sends response 708-4 to the TIR, router 704-1. Response 708-4 includes a code that indicates the test was successful, the network address of router 704-2, and a 'DR Not Reached' message that indicates that router 704-2 is an interim router on the path between the TIR, router 704-1 and the source DR, router 704-4 that successfully passed the test and the test can continue by sending query 706-2 to the next hop router, router 704-3.

Router 704-3 can begin execution of query 706-2 by determining if router 704-3 is running an MRP. Router 704-3 is running an MRP, therefore the test goes on to determine if the multicast source of data source 710 is directly connected to router 704-3. The router 704-3 is directly connected to the multicast source of data source 710, therefore response 708-5 can be sent to the TIR, router 704-1. Response 708-5 can include a code that indicates the test was successful, the network address of router 704-3, and a 'DR Reached' message that indicates that source DR, router 704-3, was reached. The TIR, router 704-1, can use the responses 708-4 and 708-5 to determine if the path including routers 704-1, 704-2, and 704-3, and 704-4 is healthy and available for transmitting multicast packets between router 704-1 and router 704-4. In some examples, the successful responses received by a TIR can indicate that a path is healthy and available for transmitting multicast packets between a TIR and a source DR. In some examples, the unsuccessful responses received by a TIR can indicate that a path is not healthy and is not available for transmitting multicast packets between a TIR and a source DR. The unsuccessful response received by a TIR can also be used to determine where a path is broken and what needs to fixed on a router to make that router a healthy router on the path.

Examples described herein are related to the use of computer system for implementing the techniques described herein. In one example, those techniques are performed by computer system in response to a processor executing one or more sequences of one or more instructions contained in memory. Such instructions may be read into memory from another non-transitory machine-readable medium, such as a storage device. Execution of the sequences of instructions contained in main memory causes processor 305 perform the process steps described herein. In alternatives, hard-wired circuitry may be used in place of or in combination with software instructions to implement variations described herein. Thus, examples described are not limited to any specific combination of hardware circuitry and software.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for searching for multicast consumers in a network of interconnected routers, the method performed by a router of the network and comprising:
   operating in a first mode, wherein in the first mode the router:
      based on multicast data to be transmitted to a first set of multicast consumers, generating a first multicast consumer search request;
      sending the first multicast consumer search request to the interconnected routers; and
      receiving, from one or more target routers in the network, identity information of one or more of the first set of multicast consumers responsive to the first multicast consumer search request, wherein the one or more target routers are directly connected to the one or more of the first set of multicast consumers; and then
   operating in a second mode, wherein in the second mode the router:
      receiving a second multicast consumer search request generated by an initiator router in the network;
      in response to receiving the second multicast consumer search request, identifying one or more multicast consumers directly connected to the router; and
      returning identity information of the identified multicast consumers to the initiator router.

2. The method of claim 1, wherein generating the first multicast consumer search request comprises inserting into the multicast consumer search request:
   an address corresponding to the router; and
   a multicast group address.

3. The method of claim 1, wherein the identity information comprises IP addresses of the multicast consumers.

4. The method of claim 1, further comprising:
   in the second mode:
   determining an origin of the second multicast consumer search request;
   identifying a source address in the second multicast consumer search request; and
   discarding the second multicast consumer search request if the determined origin is inconsistent with the source address.

5. The method of claim 1, wherein generating the first multicast consumer search request includes inserting a hop count value representing a maximum number of node-to-node transfers of the first multicast consumer search request, wherein upon reaching the hop count value, the first multicast consumer search request is discarded by a furthest router of the interconnected routers.

6. A router comprising:
   a port configured for interfacing with a network of interconnected routers;
   I/O controller circuitry coupled to the port; and
   a processor coupled to the I/O controller circuitry and implementing multicast consumer search logic that:
   operates the router in a first mode, wherein in the first mode the router is configured to:
      based on multicast data to be transmitted to a first set of multicast consumers, generate a first multicast consumer search request for transmission to the interconnected routers; and
      receive, from one or more target routers, identity information of one or more of the first set of multicast consumers responsive to the first multicast consumer search request, wherein the one or more target routers are directly connected to the one or more of the first set of multicast consumers; and then operates the router in a second mode, wherein in the second mode the router is configured to:
- receive a second multicast consumer search request, generated by an initiator router, from the I/O controller circuitry;
- in response to receiving the second multicast consumer search request, identify one or more multicast consumers directly connected to the port;
- return identity information associated with the identified one or more multicast consumers to the initiator router, and
- forward the respective multicast consumer search request to other interconnected routers in the network.

7. A non-transitory computer-readable medium storing instructions for searching for multicast consumers in a network of interconnected routers, wherein the instructions, when executed by one or more processors of a router in the network, cause the router to:
- operate in a first mode, wherein in the first mode the router is configured to:
  - based on multicast data to be transmitted to a first set of multicast consumers, generate a first multicast consumer search request;
  - send the first multicast consumer search request to the interconnected routers; and
  - receive, from one or more target routers in the network, identification information from one or more of the first set of multicast consumers responsive to the first multicast consumer search request, wherein the one or more target routers are directly connected to the one or more of the first set of multicast consumers; and then
- operate in a second mode, wherein in the second mode the router is configured to:
  - receive a second multicast consumer search request generated by an initiator router in the network of interconnected routers;
  - in response to receiving the second multicast consumer search request, identify one or more multicast consumers directly connected to the router; and
  - return identification information associated with the identified one or more multicast consumers to the initiator router.

8. The computer-readable medium of claim 7, wherein the identification information comprises IP addresses of the multicast consumers.

9. The computer-readable medium of claim 7, wherein the identification information comprises sub-net addresses with the multicast consumers.

10. The computer-readable medium of claim 7, wherein the instructions, when executed by the one or more processors, further cause the router to:
- in the first mode:
  - evaluate the identification information of the one or more of the first set of multicast consumers to determine whether each of the one or more of the first set of multicast consumers has a valid shortest path or shared tree route to transmit the multicast data; and
  - in response to determining that a respective one of the one or more of the first set of multicast consumers does not have a valid shortest path or shared tree route, record the respective multicast consumer as unreachable.

11. The computer-readable medium of claim 10, wherein the instructions, when executed by the one or more processors, further cause the router to:
- in the first mode:
  - aggregate the identification information of the one or more of the first set of multicast consumers; and
  - forward, to a network administrator, the aggregated identification information for connection evaluation.

12. The computer-readable medium of claim 7, wherein the instructions, when executed by the one or more processors, further cause the router to:
- in the first mode:
  - based on the identification information of the one or more of the first set of multicast consumers, perform a shortest path health check for each of the one or more of the first set of multicast consumers.

13. The computer-readable medium of claim 7, wherein the instructions, when executed by the one or more processors, further cause the router to:
- in the first mode:
  - based on the identification information of the one or more of the first set of multicast consumers, perform a shared tree route health check for each of the one or more of the first set of multicast consumers.

14. The computer-readable medium of claim 13, wherein generating the first multicast consumer search request includes inserting a hop count value representing a maximum number of node-to-node transfers of the first multicast consumer search request, wherein upon reaching the hop count value, the first multicast consumer search request is discarded by a furthest router of the interconnected routers.

* * * * *